(12) United States Patent
Xie et al.

(10) Patent No.: US 12,298,638 B2
(45) Date of Patent: May 13, 2025

(54) LIQUID CRYSTAL DISPLAY PANEL, MANUFACTURING METHOD THEREOF, AND DISPLAY DEVICE

(71) Applicant: Shenzhen China Star Optoelectronics Semiconductor Display Technology Co., Ltd., Shenzhen (CN)

(72) Inventors: Feifei Xie, Shenzhen (CN); Mengyang Liu, Shenzhen (CN)

(73) Assignee: Shenzhen China Star Optoelectronics Semiconductor Display Technology Co., Ltd, Shenzhen (CN)

( * ) Notice: Subject to any disclaimer, the term of this patent is extended or adjusted under 35 U.S.C. 154(b) by 0 days.

(21) Appl. No.: 17/276,162

(22) PCT Filed: Dec. 31, 2020

(86) PCT No.: PCT/CN2020/142414
§ 371 (c)(1),
(2) Date: Nov. 22, 2023

(87) PCT Pub. No.: WO2022/141519
PCT Pub. Date: Jul. 7, 2022

(65) Prior Publication Data
US 2024/0085751 A1    Mar. 14, 2024

(30) Foreign Application Priority Data
Dec. 30, 2020   (CN) .......................... 202011606295.9

(51) Int. Cl.
*G02F 1/1362* (2006.01)
*G02F 1/1333* (2006.01)
(Continued)

(52) U.S. Cl.
CPC .. *G02F 1/136295* (2021.01); *G02F 1/133388* (2021.01); *G02F 1/133516* (2013.01); *G02F 1/1339* (2013.01); *G02F 1/136204* (2013.01)

(58) Field of Classification Search
CPC ............... G02F 1/1339; G02F 2202/22; G02F 1/136204
See application file for complete search history.

(56) References Cited

U.S. PATENT DOCUMENTS

2005/0195353 A1*  9/2005  Park .................. G02F 1/133555
                                                                349/139
2012/0212698 A1*  8/2012  Lee ....................... G02F 1/1341
                                                                349/138
(Continued)

FOREIGN PATENT DOCUMENTS

| CN | 106057824 A | 10/2016 |
|----|-------------|---------|
| CN | 106940502 A | 7/2017 |

(Continued)

*Primary Examiner* — Alexander P Gross
(74) *Attorney, Agent, or Firm* — Nathan & Associates; Menachem Nathan (57) ABSTRACT

A liquid crystal display panel and a manufacturing method thereof are involved. Since a wiring layer is not disposed on a location of a non-display area corresponding to a sealant, discharge between the wiring layers at the sealant position is not induced when external static electricity occurs, thus preventing a situation that melts generated by burning and heating of the wiring layers cause a short circuit on the array substrate or the color filter substrate during a lighting test process, thereby avoiding a black screen.

12 Claims, 4 Drawing Sheets

(51) Int. Cl.
 *G02F 1/1335* (2006.01)
 *G02F 1/1339* (2006.01)

(56) References Cited

U.S. PATENT DOCUMENTS

2017/0081587 A1* 3/2017 Lee ..................... C09K 19/062
2019/0227370 A1* 7/2019 Wang ................... G02F 1/1339
2021/0165253 A1* 6/2021 Hu ..................... G02F 1/134318

FOREIGN PATENT DOCUMENTS

| CN | 109346463 A | 2/2019 | | |
|---|---|---|---|---|
| CN | 208999729 U | 6/2019 | | |
| CN | 110376805 A | * 10/2019 | ....... | G02F 1/133512 |
| JP | 2010014988 A | 1/2010 | | |
| KR | 20120122651 A | 11/2012 | | |

* cited by examiner

LIQUID CRYSTAL DISPLAY PANEL, MANUFACTURING METHOD THEREOF, AND DISPLAY DEVICE

FIELD OF INVENTION

The present disclosure relates to the field of display technology, and in particular, to a liquid crystal display panel, a manufacturing method thereof, and a display device.

BACKGROUND OF INVENTION

Display devices can convert computer data into various characters, numbers, symbols, or intuitive images for display, commands or data can be input into computers by using keyboards and other input tools, and display content can be added, deleted, and changed at any time with the aid of hardware and software of systems. According to parts used in the display devices, the display devices are divided into plasma, liquid crystals, light emitting diodes, cathode ray tubes, and other types.

LCD is an initialism for liquid crystal display. A current mainstream of LCDs is a thin film transistor liquid crystal display (TFT-LCD), which is developed from the original liquid crystal display technology. Differences between principles of cathode ray tubes (CRT) and the LCDs are that the LCD is constructed by disposing a liquid crystal cell between two glass substrates parallel to each other, disposing thin film transistors (TFT) on the lower glass substrate, and disposing a color filter (CF) on the upper glass substrate.

In an active TFT-LCD, each sub-pixel has a thin film transistor in which a gate electrode is connected to a horizontal line, a drain electrode is connected to a data line in a vertical direction, and a source electrode is connected to a pixel electrode. When enough voltage is applied on the horizontal line, all the thin film transistors on the horizontal line are opened, and the pixel electrodes on the horizontal line communicates with the data lines in the vertical direction, thereby writing display signal voltage of the data lines into pixels. By changing the signals and the voltage on thin film transistors, rotation directions of liquid crystal molecules may be controlled, so as to control whether a polarized light of each pixel point is emitted to achieve a purpose of display. The thin film transistor liquid crystal is provided with a semiconductor switch for each pixel, thus achieving complete and independent control of a pixel point. The liquid crystal material is sandwiched between an array substrate and a color filter substrate, and the rotation directions of the liquid crystal molecules may be controlled by changing the voltage value for stimulating the liquid crystals, so as to control whether the polarized light of each pixel point is emitted to achieve the purpose of display, thereby controlling the final light intensity and color.

A conventional GOA (an initialism for gate driver on array) technology is to directly manufacture a gate driving circuit on the array substrate, which replaces an external line drive integrated circuit chip (IC), thereby reducing the costs to a certain extent. Moreover, because of the high integration level, a frame of the panel may be made thin. Based on advantages of the narrow frame and the low costs, the GOA technology has been widely used.

Figure 1:
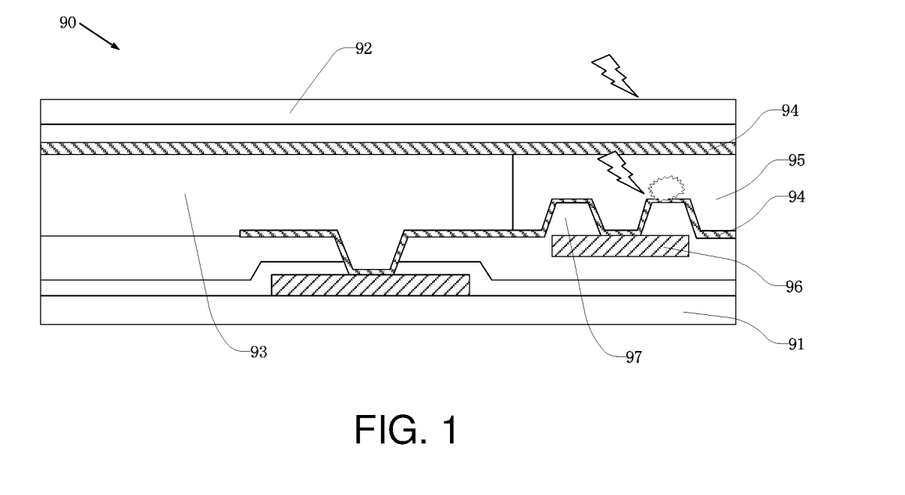
FIG. 1 is a structural schematic view of a conventional liquid crystal display panel employing a seal on busline.

However, the conventional narrow frame products employ a seal-on-busline design to increase a glass utilization, but this design may cause a black screen problem. Specifically, FIG. 1 is a structural schematic view of a conventional seal-on-busline liquid crystal display panel. A liquid crystal display panel 90 includes an array substrate 91 and a color filter substrate 92, a gap is formed between the array substrate 91 and the color filter substrate 92, and the gap is filled with liquid crystal to form a liquid crystal layer 93. Indium tin oxide (ITO) is provided on both of a side of the array substrate 91 facing the liquid crystal layer and a side of the color filter substrate 92 facing the liquid crystal layer to serve as wiring layers 94, thus achieving the display driving of the liquid crystal layer 93. A sealant 95 is employed to seal edges of the array substrate 91 and the color filter substrate 92. In an aspect, since the array substrate is provided with a wire-changing metal layer 96 at a position corresponding to the seal 95, and is provided with a dam structure 97 arranged on the wire-changing metal layer 96, a distance between the wiring layer 94 located on a side of the array substrate 91 and the wiring layer 94 located on a side of the color filter substrate 92 is reduced. When the liquid crystal display panel 90 is subjected to external static electricity, discharge between the wiring layers 94 at the sealant 95 position is induced. The external static electricity increases a melting resistance of the wiring layers 94, and burning and heating occur during a lighting test process, such that indium tin oxide melts of the wiring layers 94 cause a short circuit on the array substrate 91 or the color filter substrate 92, thereby resulting in a black screen problem.

Therefore, we need to seek a novel liquid crystal display panel to prevent the above-mentioned problems.

SUMMARY OF INVENTION

Technical Problem

A purpose of the present disclosure is to provide a liquid crystal display panel, a manufacturing method, and a display device to solve technical problems that when conventional liquid crystal panels are subjected to external static electricity, discharge between wiring layers at sealant position is induced, the external static electricity increases a melting resistance of the wiring layers, and burning and heating occur during a lighting test process, such that indium tin oxide melts of the wiring layers cause a short circuit on an array substrate or a color filter substrate, thereby resulting in a black screen.

Technical Solutions

In order to solve the above-mentioned problems, an embodiment of the present disclosure provides a liquid crystal display panel including a display area and a non-display area surrounding the display area, wherein the non-display area includes a first region; an array substrate; and a color filter substrate disposed opposite the array substrate, wherein a first wiring layer is disposed on a surface of the color filter substrate facing the array substrate, the first wiring layer extends from the display area to the non-display area, and a gap is defined by the first wiring layer of the color filter substrate at a location corresponding to the first region.

Moreover, the liquid crystal display panel further includes a sealant disposed between the array substrate and the color filter substrate, distributed in the first region, and filling the gap.

Moreover, the first wiring layer includes common electrode wires.

Moreover, a second wiring layer is disposed on a surface of the array substrate facing the color filter substrate, and the second wiring layer is disposed in the non-display area.

Moreover, the second wiring layer includes signal wires.

Furthermore, the array substrate includes a first substrate; a first metal layer disposed on the first substrate; a gate insulation layer disposed on the first substrate and covering the first metal layer; a passivation layer disposed on the gate insulation layer; a second metal layer embedded in the passivation layer near an upper surface of the passivation layer and located in the first region; and the second wiring layer disposed on the passivation layer, wherein the second wiring layer passes through the passive layer and the gate insulation layer to be electrically connected to the first metal layer, and extends to the first region to electrically connected to the second metal layer.

Furthermore, the second metal layer is disposed on an upper surface of the gate insulation layer, the passivation layer forms two protrusions above the second metal layer, and the second recess is located between the two adjacent protrusions.

Another embodiment of the present disclosure further provides a manufacturing method of the foregoing liquid crystal display panel including steps of:
manufacturing an array substrate;
manufacturing a color filter substrate, wherein the color filter substrate is provided with a first wiring layer, the first wiring layer extends from a display area to a non-display area, and a gap is defined by the first wiring layer at a location corresponding to a first region in the non-display area; and
disposing the color filter substrate opposite the array substrate, wherein a sealant is disposed in the non-display area to connect the color filter substrate and the array substrate, is distributed in the first region, and fills the gap.

Moreover, in the step of manufacturing the color filter substrate, a mask is employed to form the gap at the location of the first region corresponding to the sealant.

Furthermore, in an embodiment, the step of manufacturing the array substrate includes:
manufacturing a first metal layer on a first substrate;
manufacturing a gate insulation layer on the first substrate, wherein the gate insulation layer covers the first metal layer;
manufacturing a passivation layer on the gate insulation layer;
embedding a second metal layer in the passivation layer near an upper surface of the passivation layer is located in the first region, and a first recess extending to a surface of the first metal layer and a second recess extending to a surface of the second metal layer are defined by the passivation layer; and
manufacturing a second wiring layer on the passivation layer, wherein the second wiring layer extends to surfaces of the first recess and the second recess to be connected with the first metal layer and the second metal layer.

Furthermore, in another embodiment, the step of manufacturing the array substrate includes:
manufacturing a first metal layer on a first substrate;
manufacturing a gate insulation layer on the first substrate, wherein the gate insulation layer covers the first metal layer;
manufacturing a second metal layer on the gate insulation layer, wherein the second metal layer is located in the first region;
manufacturing a passivation layer on the gate insulation layer, wherein the passivation layer covers the second metal layer, and a first recess extending to a surface of the first metal layer and a second recess extending to a surface of the second metal layer are defined by the passivation layer; and
manufacturing a second wiring layer on the passivation layer, wherein the second wiring layer extends to surfaces of the first recess and the second recess to be connected with the first metal layer and the second metal layer.

Another embodiment of the present disclosure further provides a display device including the liquid crystal display panel involved in the present disclosure.

Advantageous Effects

The present disclosure relates to a liquid crystal display panel, a manufacturing method thereof, and a display device. In the present disclosure, since the first wiring layer is not disposed on a location of the non-display area corresponding to the sealant, discharge on the second wiring layer at the sealant position is not induced when the external static electricity occurs, thus preventing a situation that the melts generated by burning and heating of the second wiring layer cause the short circuit on the array substrate or the color filter substrate during the lighting test process, thereby avoiding a black screen. Moreover, since a distance between the array substrate and the color filter substrate at the sealant position is increased, a distance between the second wiring layer and the color filter layer is increased, so that the discharge on the second wiring layer at the sealant position is not induced when the external static electricity occurs, thereby improving product reliability.

DESCRIPTION OF DRAWINGS

In conjunction with accompanying drawings, the following detailed description of specific implementations of the present application makes technical solutions and other advantageous effects of the present disclosure clear.

The parts in the drawings are identified as follows.

| | |
|---|---|
| 100 liquid crystal display panel | 101 display area |
| 102 non-display area | 1 first substrate |
| 2 gate insulation layer | 3 passivation layer |
| 4 second wiring layer | 5 first polyimide layer |
| 6 second polyimide layer | 7 liquid crystal layer |
| 8 first wiring layer | 9 black matrix layer |
| 10 second substrate | 11 sealant |
| 12 protrusion | 21 first metal layer |
| 31 second metal layer | 81 gap |

-continued

| | |
|---|---|
| 110 array substrate | 111 first recess |
| 120 color filter substrate | 121 second recess |
| 200 mask | |

DETAILED DESCRIPTION OF PREFERRED EMBODIMENTS

In conjunction with the accompanying drawings, preferred embodiments of the present disclosure are described in detail below to completely explain technical content of the present disclosure to those skilled in the art, so as to exemplify implementation of the present disclosure to make the technical content disclosed by the present disclosure clearer, thus allowing those skilled in the art to more readily understand how to implement the present disclosure. However, the present disclosure may be embodied in many different forms of the embodiments, and the protection scope of the present disclosure is not limited to the embodiments described herein. The description of the following embodiments is not intended to limit the scope of the present disclosure.

The directional terms described by the present disclosure, such as "upper", "lower", "front", "back", "left", "right", "inner", "outer", "side", etc., are only directions by referring to the accompanying drawings. Thus, the directional terms used herein are used to explain and understand the present disclosure, rather than limit the protection scope of the present disclosure.

In the accompanying drawings, elements with similar structures are indicated with the same reference numbers. Components that are structurally or functionally similar are denoted by similar reference numerals. Moreover, a size and thickness of each component shown in the drawings are arbitrarily shown for ease of understanding and description, and the present disclosure does not limit the size and thickness of each component.

When certain components are described as being "on" another component, the components may be directly disposed on the another component, or an intermediate component may be provided in which the component is disposed on the intermediate component, and the intermediate component is placed on the another component. When a component is described as being "mounted to" or "connected to" another component, it can be understood that either the component is directly mounted to or connected to the another component, or the component is mounted to or connected to the another component via an intermediate component.

First Embodiment

Figure 2:
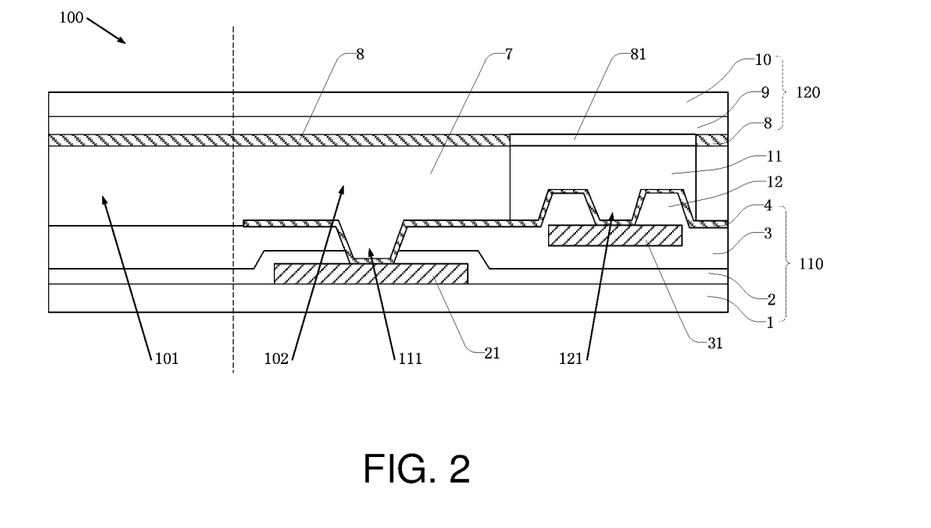
FIG. 2 is a structural schematic view of a liquid crystal display panel in a first embodiment of the present disclosure.

As shown in FIG. 2, a liquid crystal display panel 100 includes a display area 101 and a non-display area 102 surrounding the display area 101, and the non-display area 102 includes a first region. The liquid crystal display panel 100 of the non-display area 102 includes an array substrate 110, a color filter substrate 120, a liquid crystal layer 7, and a sealant 11. The color filter substrate 120 is disposed opposite the array substrate 110, the liquid crystal layer 7 is disposed between the array substrate 110 and the color filter substrate 120, and the sealant 11 is disposed around the liquid crystal layer 110 and located in the non-display area 102. Moreover, a region where the sealant 11 is distributed corresponds to a GOA region of the non-display area 102, and the region is the first region.

As shown in FIG. 2, the array substrate 110 includes: a first substrate 1, a gate insulation layer 2, a passivation layer 3, and a second wiring layer 4.

As shown in FIG. 2, the gate insulation layer 2 is disposed on the first substrate 1, and a first metal layer 21 is disposed in the gate insulation layer 2. The gate insulation layer 2 (also known as a gate insulator, an initialism is GI) is an insulation layer between gate metal and semiconductor Si, and material of the insulation layer may be SiNx or SiOx.

The passivation layer 3 is disposed on the gate insulation layer 12, and a second metal is disposed in the passivation layer 3. The passivation layer 3 is partially recessed downward to an upper surface of the first metal layer 21 to form a first recess 111, and the passivation layer 3 is partially recessed downward to an upper surface of the second metal layer 31 to form a second recess 121. The passivation layer 3 mainly plays a role of insulation and protection, and material of the passivation layer 3 is SiNx or SiOx. Specifically, the second wiring layer 4 passes through the first recess 111 located at the passive layer 3 and the insulation layer 2 to be electrically connected to the first metal layer 21, and extends through the second recess 121 to electrically connected to the second metal layer 31.

The first recess 111 extending to the surface of the first metal layer 21 and the second recess 121 extending to the surface of the second metal layer 31 are defined by the passivation layer 3. The second wiring layer 4 is disposed on the passivation layer 3, the first recess 111, and the second recess 121. Specifically, the second wiring layer 4 is disposed on the passivation layer 3, and extends to surfaces of the first recess 111 and the second recess 121 to be connected with the first metal layer 21 and the second metal layer 31. Firstly, since an indium tin oxide (ITO) thin film has a high conductivity, a low potential voltage is generated by communicating the second wiring layer 4 with the first metal layer 21 and the second metal layer 31. Secondly, since the indium tin oxide (ITO) thin film has a high transmittance, the second wiring layer 4 allows light emitted from a back light module to pass through this layer and to be utilized, thereby improving light use efficiency. The second wiring layer 4 includes signal wires for transmitting CK signals.

A first polyimide layer 5 is disposed on the second wiring layer 4. Solid contents in the first polyimide layer 5 are small molecule compounds in the stock solution which generate a polymerization reaction under high temperature to form a long-chain macromolecular solid polymer polyamide with many branched chains. An angle between the branch chain and the main chain in the polymer molecule is a so-called pretilt angle of an alignment layer. Since force between the branched groups of these polymers and the liquid crystal molecules is strong, which has an anchoring effect on the liquid crystal molecule, the liquid crystal molecules may be arranged in a direction of the pretilt angle.

As shown in FIG. 2, the color filter substrate 120 includes: a first wiring layer 8, a black matrix layer 9, and a second substrate 10. The first wiring layer 8 and the second wiring layer 4 are made of the same material which is indium tin oxide (ITO).

As shown in FIG. 2, the black matrix layer 9 is disposed on a surface of the first wiring layer 8 away from the array substrate 110, and the second substrate 10 is disposed on the black matrix layer 9.

As shown in FIG. 2, at least one gap 81 is defined by the first wiring layer 8 at a location corresponding to the sealant 11, and the gap 81 divides the first wiring layer 8 of the non-display area 102 into at least two electrode wire segments spaced apart from each other. Preferably, a width of the gap 81 is the same as a width of the sealant.

As shown in FIG. 2, the electrode wire segments in the first wiring layer 8 facing the display area 101 are common electrode wires. The electrode wire segments in the first wiring layer 8 away from the display area 101 is configured to be grounding electrodes, and thus the potential of the entire liquid crystal display panel 100 may be stable.

As shown in FIG. 2, the gap 81 between the electrode wire segments of the first wiring layer 8 is filled with the material used in the sealant 11.

The array substrate 110 further includes at least two protrusions 12 disposed above the second metal layer 31. The passivation layer 3 forms the at least two protrusions 12, and the second recess 121 is located between the two adjacent protrusions 12. The second wiring layer 4 covers the protrusions 12, and is electrically connected to the second metal layer 31 at the second recess 121.

In the embodiment, the second metal layer 31 is embedded in an upper surface of the passivation layer 3, and the protrusions 12 is partially located on the second metal layer 31 and is partially located on the passivation layer 3. The protrusions 12 realize the insulation between the second metal layer 31 and the second wiring layer 4. Preferably, the protrusion 12 and the passivation layer 3 are integrally formed.

In the embodiment, since the first wiring layer 8 is not disposed on the location of the non-display area 102 corresponding to the sealant 11, discharge on the first wiring layer 8 at the sealant 11 position is not induced when external static electricity occurs, thus preventing a situation that melts generated by burning and heating of the first wiring layer 8 cause a short circuit on the array substrate 110 or the color filter substrate 120 during a lighting test process, thereby avoiding a black screen. Moreover, since the gap 81 is defined between the electrode wire segments of the first wiring layer 8 to form an undulating structure, the electrodes forming an electrolytic cell on one side are removed, thus avoiding electrochemical corrosion caused by the formation of the electrolytic cell, and improving product reliability.

Second Embodiment

Figure 3:
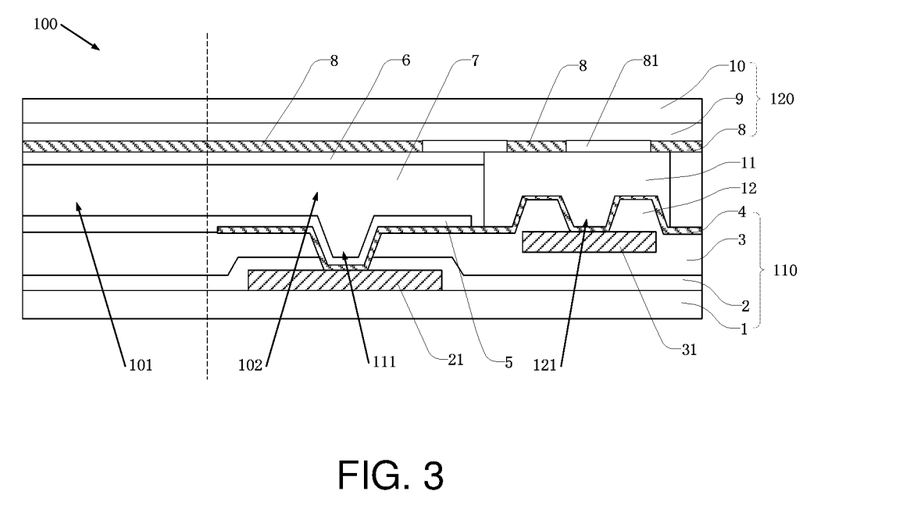
FIG. 3 is a structural schematic view of a liquid crystal display panel in a second embodiment of the present disclosure.

As shown in FIG. 3, a liquid crystal display panel 100 includes a display area 101 and a non-display area 102 surrounding the display area 101, and the non-display area 102 includes a first region. The liquid crystal display panel 100 of the non-display area 102 includes an array substrate 110, a color filter substrate 120, a liquid crystal layer 7, and a sealant 11. The color filter substrate 120 is disposed opposite the array substrate 110, the liquid crystal layer 7 is disposed between the array substrate 110 and the color filter substrate 120, and the sealant 11 is disposed around the liquid crystal layer 110 and located in the non-display area 102. Moreover, a region where the sealant 11 is distributed corresponds to the first region of the non-display area 102.

As shown in FIG. 3, the array substrate 110 includes: a first substrate 1, a gate insulation layer 2, a passivation layer 3, a second wiring layer 4, and a first polyimide layer 5.

As shown in FIG. 3, the gate insulation layer 2 is disposed on the first substrate 1, and a first metal layer 21 is disposed in the gate insulation layer 2. The gate insulation layer 2 (also known as a gate insulator, an initialism is GI) is an insulation layer between gate metal and semiconductor Si, and material of the insulation layer may be SiNx or SiOx.

The passivation layer 3 is disposed on the gate insulation layer 12, and a second metal is disposed in the passivation layer 3. The passivation layer 3 is partially recessed downward to an upper surface of the first metal layer 21 to form a first recess 111, and the passivation layer 3 is partially recessed downward to an upper surface of the second metal layer 31 to form a second recess 121. The passivation layer 3 mainly plays a role of insulation and protection, and material of the passivation layer 3 is SiNx or SiOx.

The first recess 111 extending to the surface of the first metal layer 21 and the second recess 121 extending to the surface of the second metal layer 31 are defined by the passivation layer 3. The second wiring layer 4 is disposed on the passivation layer 3, the first recess 111, and the second recess 121. Specifically, the second wiring layer 4 is disposed on the passivation layer 3, and extends to surfaces of the first recess 111 and the second recess 121 to be connected with the first metal layer 21 and the second metal layer 31. Firstly, since an indium tin oxide (ITO) thin film has a high conductivity, a low potential voltage is generated by communicating the second wiring layer 4 with the first metal layer 21 and the second metal layer 31. Secondly, since the indium tin oxide (ITO) thin film has a high transmittance, the second wiring layer 4 allows light emitted from a back light module to pass through this layer and to be utilized, thereby improving light use efficiency. The second wiring layer 4 includes signal wires for transmitting CK signals.

The first polyimide layer 5 is disposed on the second wiring layer 4. Solid contents in the first polyimide layer 5 are small molecule compounds in the stock solution which generate a polymerization reaction under high temperature to form a long-chain macromolecular solid polymer polyamide with many branched chains. An angle between the branch chain and the main chain in the polymer molecule is a so-called pretilt angle of an alignment layer. Since force between the branched groups of these polymers and the liquid crystal molecules is strong, which has an anchoring effect on the liquid crystal molecule, the liquid crystal molecules may be arranged in a direction of the pretilt angle.

As shown in FIG. 3, the color filter substrate 120 includes: a second polyimide layer 6, a first wiring layer 8, a black matrix layer 9, and a second substrate 10. The first wiring layer 8 and the second wiring layer 4 are made of the same material which is indium tin oxide (ITO).

As shown in FIG. 3, the second polyimide layer 6 is correspondingly disposed above the first polyimide layer 5. The first wiring layer 8 is disposed on the second polyimide layer 6, and includes a plurality of electrode wire segments spaced apart from each other. The black matrix layer 9 is disposed on a surface of the first wiring layer 8 away from the array substrate 110, and the second substrate 10 is disposed on the black matrix layer 9.

As shown in FIG. 3, the electrode wire segments of the first wiring layer 8 are configured to be spaced apart from each other, a gap 81 between the electrode wire segments of the first wiring layer 8 are defined at a location corresponding to the first metal layer 21, and a gap 81 between the electrode wire segments of the first wiring layer 8 are defined at a location corresponding to the second metal layer 31. Such a configuration is mainly due to reasons that the positions of the first metal layer 21 and the second metal layer 31 are extremely vulnerable to be corroded in comparison to other positions, so the formation of electrolytic cells may be avoided by removing the first wiring layer 8 at the locations corresponding to the first metal layer 21 and the second metal layer 31, thus preventing the electrochemical corrosion in the first region and improving product reliability.

As shown in FIG. 3, the electrode wire segments in the first wiring layer 8 facing the display area 101 are common electrode wires. The electrode wire segments in the first wiring layer 8 away from the display area 101 is configured to be grounding electrodes, and thus the potential of the entire liquid crystal display panel 100 may be stable.

As shown in FIG. 3, the gap 81 between the electrode wire segments of the first wiring layer 8 is filled with the material used in the second polyimide layer 6, or is also filled with material used in the sealant 11 at the same time. The main reason is that the gap 81 is defined between the electrode wire segments to form an undulating structure, so the polyimide material used in the second polyimide layer 6 is easily accumulated in the first area to cause a thickness of the second polyimide layer 6 in the first region to be increased, thereby enhancing a protection effect on the first wiring layer 8, ensuring normal conversion of signals, and improving the product reliability.

In the embodiment, the second metal layer 31 is disposed on the gate insulation layer 2, that is, the second metal layer 31 is disposed between the gate insulation layer 2 and the passivation layer 3. Protrusions 12 are disposed above the second metal layer 31. The passivation layer 3 forms at least two protrusions 12, and the second recess 121 is located between the two adjacent protrusions 12. The protrusions 12 realize the insulation between the second metal layer 31 and the second wiring layer 4. This design may allow a thickness of the array substrate 110 at a location corresponding to the second metal layer 31 to be decreased, so that a distance between the array substrate 110 and the color filter substrate 120 at the sealant 11 position is increased, and a distance between the first wiring layer 8 and the array substrate 110 is increased, thus preventing discharge on the first wiring layer 8 at the sealant 11 position from being induced when external static electricity occurs.

In the embodiment, since the first wiring layer 8 is not disposed on the location of the non-display area 102 corresponding to the sealant 11, discharge on the first wiring layer 8 at the sealant 11 position is not induced when the external static electricity occurs, thus preventing a situation that melts generated by burning and heating of the first wiring layer 8 cause a short circuit on the array substrate 110 or the color filter substrate 120 during a lighting test process, thereby avoiding a black screen. Moreover, since the gap 81 is defined between the electrode wire segments of the first wiring layer 8 to form the undulating structure, the electrodes forming an electrolytic cell on one side are removed, thus avoiding the electrochemical corrosion caused by the formation of the electrolytic cell, and improving the product reliability.

Figure 4:
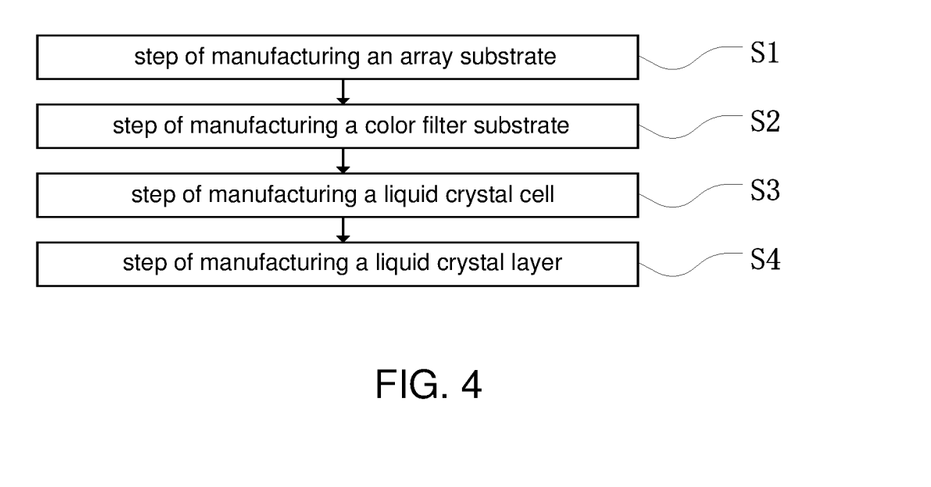
FIG. 4 is a flow chart of a manufacturing method of the liquid crystal display panel in the embodiments of the present disclosure.

As shown in FIG. 4, the present disclosure further provides a manufacturing method of the foregoing liquid crystal display panel 110 including following steps S1 to S4.

S1 is a step of manufacturing the array substrate in which an array substrate 110 is fabricated, and includes the first wiring layer.

S2 is a step of manufacturing the color filter substrate in which a color filter substrate 120 is fabricated, and includes the second wiring layer. At least one gap 81 is defined by the first wiring layer in the non-display area, and the gap 81 divides the first wiring layer of the non-display area into at least two electrode wire segments spaced apart from each other.

S3 is a step of manufacturing the liquid crystal cell in which the color filter substrate 120 is disposed opposite the array substrate 110, the sealant is disposed in the non-display area to be connected with the color filter substrate 120 and the array substrate 110, and the sealant is disposed around the display area, is distributed in the first region, and corresponds to the at least one gap 81.

S4 is a step of manufacturing the liquid crystal layer in which the liquid crystal layer is fabricated between the array substrate 110 and the color filter substrate 120.

It is noted that in the step S1 of manufacturing the array substrate, the array substrate may be fabricated according to the above-mentioned first embodiment or second embodiment. The main distinction is that the position of the second metal layer 31 in the first embodiment is different from that in the second embodiment. Preferably, the structure of the array substrate 110 in the second embodiment may cause the thickness of the array substrate 110 at the location corresponding to the second metal layer 31 to be decreased, so that the distance between the array substrate 110 and the color filter substrate 120 at the sealant 11 position is increased, and the distance between the first wiring layer 8 and the array substrate 110 is increased, thus preventing the discharge on the first wiring layer 8 at the sealant 11 position from being induced when the external static electricity occurs.

Figure 5:
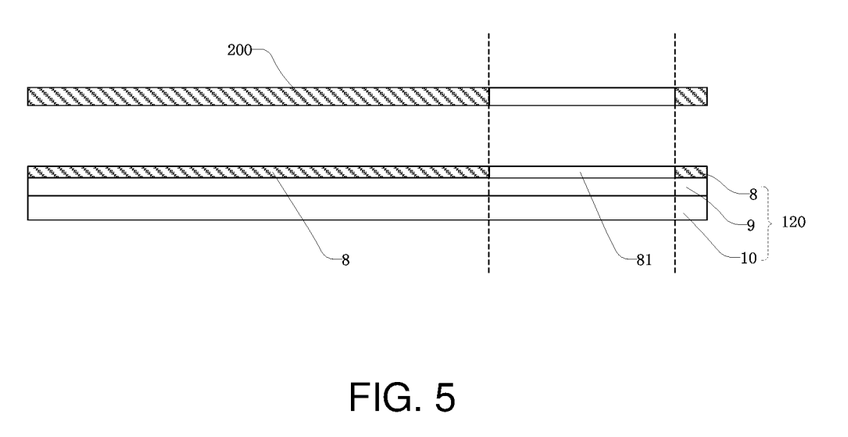
FIG. 5 is a structural schematic view of the step of manufacturing a color filter substrate described in FIG. 4.

In the step S2 of manufacturing the color filter substrate, as shown in FIG. 5, by employing a mask 200, the first wiring layer 8 is not disposed on the location of the non-display area 102 corresponding to the sealant 11, but the gap 81 is formed at the location corresponding to the sealant 11, so that the discharge on the first wiring layer 8 at the sealant 11 position is not induced when the external static electricity occurs, thus preventing the situation that the melts generated by burning and heating of the first wiring layer 8 cause the short circuit on the array substrate 110 or the color filter substrate 120 during the lighting test process, thereby avoiding the black screen. Moreover, since the gap 81 is defined between the electrode wire segments of the first wiring layer 8 to form the undulating structure, the electrodes forming the electrolytic cell on one side are removed, thus avoiding the electrochemical corrosion caused by the formation of the electrolytic cell, and improving the product reliability. Furthermore, compared to a method of manufacturing the first wiring layer 8 followed by etching the first wiring layer 8 to generate the gap 81, quality of the method in which the first wiring layer 8 is not disposed on the location of the non-display area 102 corresponding to the sealant 11 by employing the mask 200 is more desirable because the method of manufacturing the first wiring layer 8 followed by etching the first wiring layer 8 to generate the gap 81 has a defect that the etching results in light leakage of the color filter substrate 120.

In an embodiment, the step S1 of manufacturing the array substrate includes:
manufacturing a first metal layer 1 on a first substrate 21;
manufacturing a gate insulation layer 2 on the first substrate 1, wherein the gate insulation layer 2 covers the first metal layer 21;
manufacturing a passivation layer 3 on the gate insulation layer 2;
embedding a second metal layer 31 in the passivation layer 3 near an upper surface of the passivation layer 3, wherein the second metal layer 31 is located in the first region, and a first recess 111 extending to a surface of the first metal layer 21 and a second recess 121 extending to a surface of the second metal layer 31 are defined by the passivation layer 3; and manufacturing a second wiring layer 4 on the passivation layer 3, wherein the second wiring layer 4 extends to surfaces of the first recess 111 and the second recess 121 to be connected with the first metal layer 21 and the second metal layer 31.

In another embodiment, the step S1 of manufacturing the array substrate includes:

manufacturing a first metal layer 1 on a first substrate 21;

manufacturing a gate insulation layer 2 on the first substrate 1, wherein the gate insulation layer 2 covers the first metal layer 21;

manufacturing a second metal layer 31 on the gate insulation layer 2, wherein the second metal layer 31 is located in the first region;

manufacturing a passivation layer 3 on the gate insulation layer 2, wherein the passivation layer 3 covers the second metal layer 31, and a first recess 111 extending to a surface of the first metal layer 21 and a second recess 121 extending to a surface of the second metal layer 31 are defined by the passivation layer 3; and manufacturing a second wiring layer 4 on the passivation layer 3, wherein the second wiring layer 4 extends to surfaces of the first recess 111 and the second recess 121 to be connected with the first metal layer 21 and the second metal layer 31.

Based on the same invention concept, the embodiments of the present disclosure provide a display device including the display panel 100 provided by the above embodiments. The display device in the embodiments of the present disclosure may be: mobile phones, tablet computers, televisions, monitors, laptops, digital photo frames, navigators, and any other product or part with display functions.

A work principle of the display device provided by the embodiments is consistent with a work principle of the embodiments of the above-mentioned display panel 100. The specific structural relationships and the work principles refer to the embodiments of the above-mentioned display panel 100, and thus is not redundantly described in detail herein.

The liquid crystal display panel, the manufacturing method thereof, and the display device provided by the present disclosure have been described in detail above. It should be understood that the exemplary embodiments described herein should be regarded as illustrative only, is used to facilitate understanding the methods of the present disclosure and core concepts thereof, and are not intended to limit the present disclosure. Descriptions of features or aspects in each exemplary embodiment should generally be regarded as suitable for similar features or aspects in other exemplary embodiments. Although the present disclosure has been described with reference to the exemplary embodiments, various changes and modifications can be made by those skilled in the art. The present disclosure is intended to cover such changes and modifications within the scope of the appended claims. All the modifications, equivalent replacements, improvements, etc., made within the spirit and the principles of the present disclosure should be included in the protection scope of the present disclosure.

What is claimed is:

1. A liquid crystal display panel, comprising:
   a display area and a non-display area surrounding the display area, wherein the non-display area includes a first region;
   an array substrate;
   a color filter substrate disposed opposite the array substrate, wherein a first wiring layer is disposed on a surface of the color filter substrate facing the array substrate, the first wiring layer extends from the display area to the non-display area, and a gap is defined by the first wiring layer at a location corresponding to the first region; and
   a sealant disposed between the array substrate and the color filter substrate, distributed in the first region, and filling the gap;
   wherein, a region where the sealant is distributed corresponds to a GOA region of the first region, the gap divides the first wiring layer of the non-display area into two electrode wire segments spaced apart from each other, and a width of the gap is the same as a width of the sealant.

2. The liquid crystal display panel according to claim 1, wherein a second wiring layer is disposed on a surface of the array substrate facing the color filter substrate, and the second wiring layer is disposed in the non-display.

3. The liquid crystal display panel according to claim 2, wherein the array substrate includes:
   a first substrate;
   a first metal layer disposed on the first substrate;
   a gate insulation layer disposed on the first substrate and covering the first metal layer;
   a passivation layer disposed on the gate insulation layer; and
   a second metal layer embedded in the passivation layer near an upper surface of the passivation layer and located in the first region, wherein a first recess extending to a surface of the first metal layer and a second recess extending to a surface of the second metal layer are defined by the passivation layer;
   wherein the second wiring layer is disposed on the passivation layer and extends to surfaces of the first recess and the second recess to be connected with the first metal layer and the second metal layer.

4. The liquid crystal display panel according to claim 3, wherein the second metal layer is disposed on an upper surface of the gate insulation layer, the passivation layer forms two protrusions above the second metal layer, and the second recess is located between the two adjacent protrusions.

5. A manufacturing method of the liquid crystal display panel, the liquid crystal display panel comprising a display area and a non-display area surrounding the display area, wherein the non-display area includes a first region, the manufacturing method comprising steps of:
   manufacturing an array substrate;
   manufacturing a color filter substrate, wherein the color filter substrate is provided with a first wiring layer, the first wiring layer extends from the display area to the non-display area, and a gap is defined by the first wiring layer at a location corresponding to the first region in the non-display area; and
   disposing the color filter substrate opposite the array substrate, wherein a sealant is disposed in the non-display area to connect the color filter substrate and the array substrate, is distributed in the first region, and fills the gap; and wherein a region where the sealant is distributed corresponds to a GOA region of the first region, the gap divides the first wiring layer of the non-display area into two electrode wire segments spaced apart from each other, and a width of the gap is the same as a width of the sealant.

6. The manufacturing method of the liquid crystal display panel according to claim 5, wherein in the step of manufacturing the color filter substrate, a mask is employed to form the gap at the location of the first region corresponding to the sealant.

7. The manufacturing method of the liquid crystal display panel according to claim 5, wherein the step of manufacturing the array substrate includes:
 manufacturing a first metal layer on a first substrate;
 manufacturing a gate insulation layer on the first substrate, wherein the gate insulation layer covers the first metal layer;
 manufacturing a passivation layer on the gate insulation layer;
 embedding a second metal layer in the passivation layer near an upper surface of the passivation layer, wherein the second metal layer is located in the first region, and a first recess extending to a surface of the first metal layer and a second recess extending to a surface of the second metal layer are defined by the passivation layer; and
 manufacturing a second wiring layer on the passivation layer, wherein the second wiring layer extends to surfaces of the first recess and the second recess to be connected with the first metal layer and the second metal layer.

8. The manufacturing method of the liquid crystal display panel according to claim 5, wherein the step of manufacturing the array substrate includes:
 manufacturing a first metal layer on a first substrate;
 manufacturing a gate insulation layer on the first substrate, wherein the gate insulation layer covers the first metal layer;
 manufacturing a second metal layer on the gate insulation layer, wherein the second metal layer is located in the first region;
 manufacturing a passivation layer on the gate insulation layer, wherein the passivation layer covers the second metal layer, and a first recess extending to a surface of the first metal layer and a second recess extending to a surface of the second metal layer are defined by the passivation layer; and
 manufacturing a second wiring layer on the passivation layer, wherein the second wiring layer extends to surfaces of the first recess and the second recess to be connected with the first metal layer and the second metal layer.

9. A display device, comprising a liquid crystal display panel, wherein the liquid crystal display panel comprises:
 a display area and a non-display area surrounding the display area, wherein the non-display area includes a first region;
 an array substrate;
 a color filter substrate disposed opposite the array substrate, wherein a first wiring layer is disposed on a surface of the color filter substrate facing the array substrate, the first wiring layer extends from the display area to the non-display area, a gap is defined by the first wiring layer at a location corresponding to the first region; and
 a sealant disposed between the array substrate and the color filter substrate, distributed in the first region, and filling the gap;
 wherein a region where the sealant is distributed corresponds to a GOA region of the first region, the gap divides the first wiring layer of the non-display area into two electrode wire segments spaced apart from each other, and a width of the gap is the same as a width of the sealant.

10. The display device according to claim 9, wherein a second wiring layer is disposed on a surface of the array substrate facing the color filter substrate, and the second wiring layer is disposed in the non-display.

11. The display device according to claim 10, wherein the array substrate includes:
 a first substrate;
 a first metal layer disposed on the first substrate;
 a gate insulation layer disposed on the first substrate and covering the first metal layer;
 a passivation layer disposed on the gate insulation layer; and
 a second metal layer embedded in the passivation layer near an upper surface of the passivation layer and located in the first region, wherein a first recess extending to a surface of the first metal layer and a second recess extending to a surface of the second metal layer are defined by the passivation layer;
 wherein the second wiring layer is disposed on the passivation layer and extends to surfaces of the first recess and the second recess to be connected with the first metal layer and the second metal layer.

12. The display device according to claim 11, wherein the second metal layer is disposed on an upper surface of the gate insulation layer, the passivation layer forms two protrusions above the second metal layer, and the second recess is located between the two adjacent protrusions.

* * * * *